June 11, 1940.  H. O. HEM  2,203,782
TESTING DEVICE
Filed Jan. 11, 1939  4 Sheets-Sheet 1
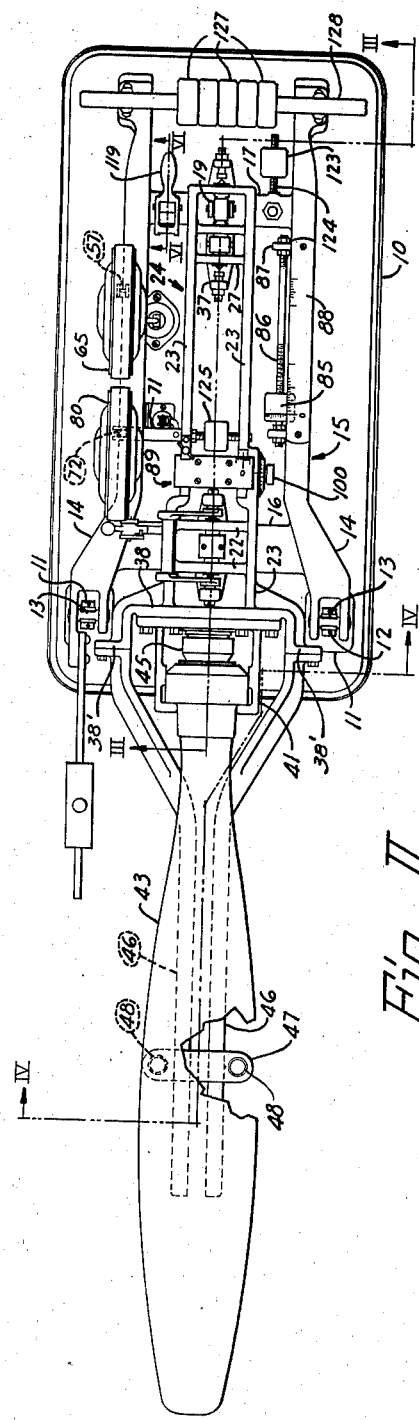
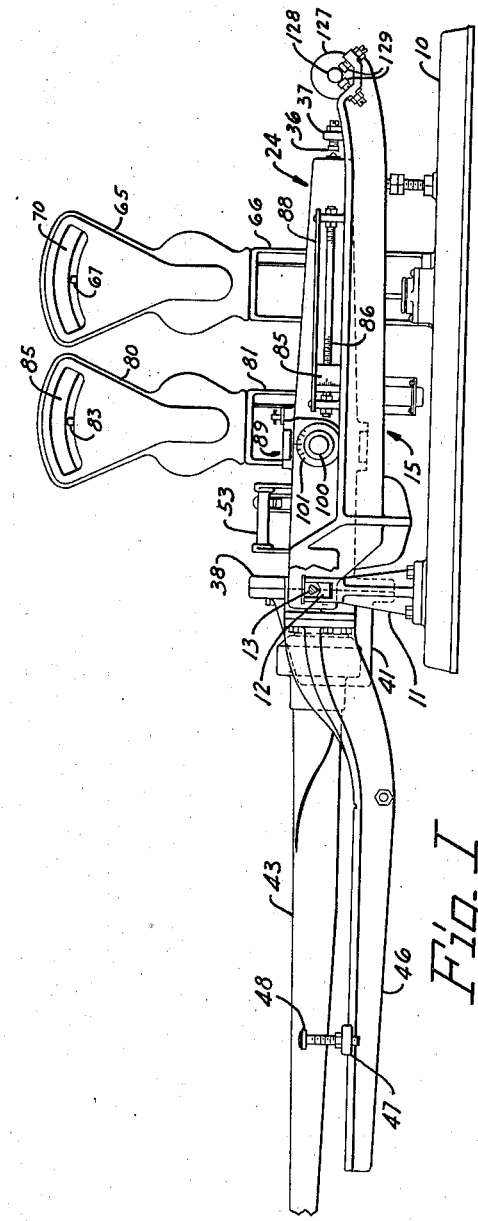
Fig. II
Fig. I
Halvor O. Hem
INVENTOR
BY Marshall & Marshall
ATTORNEYS

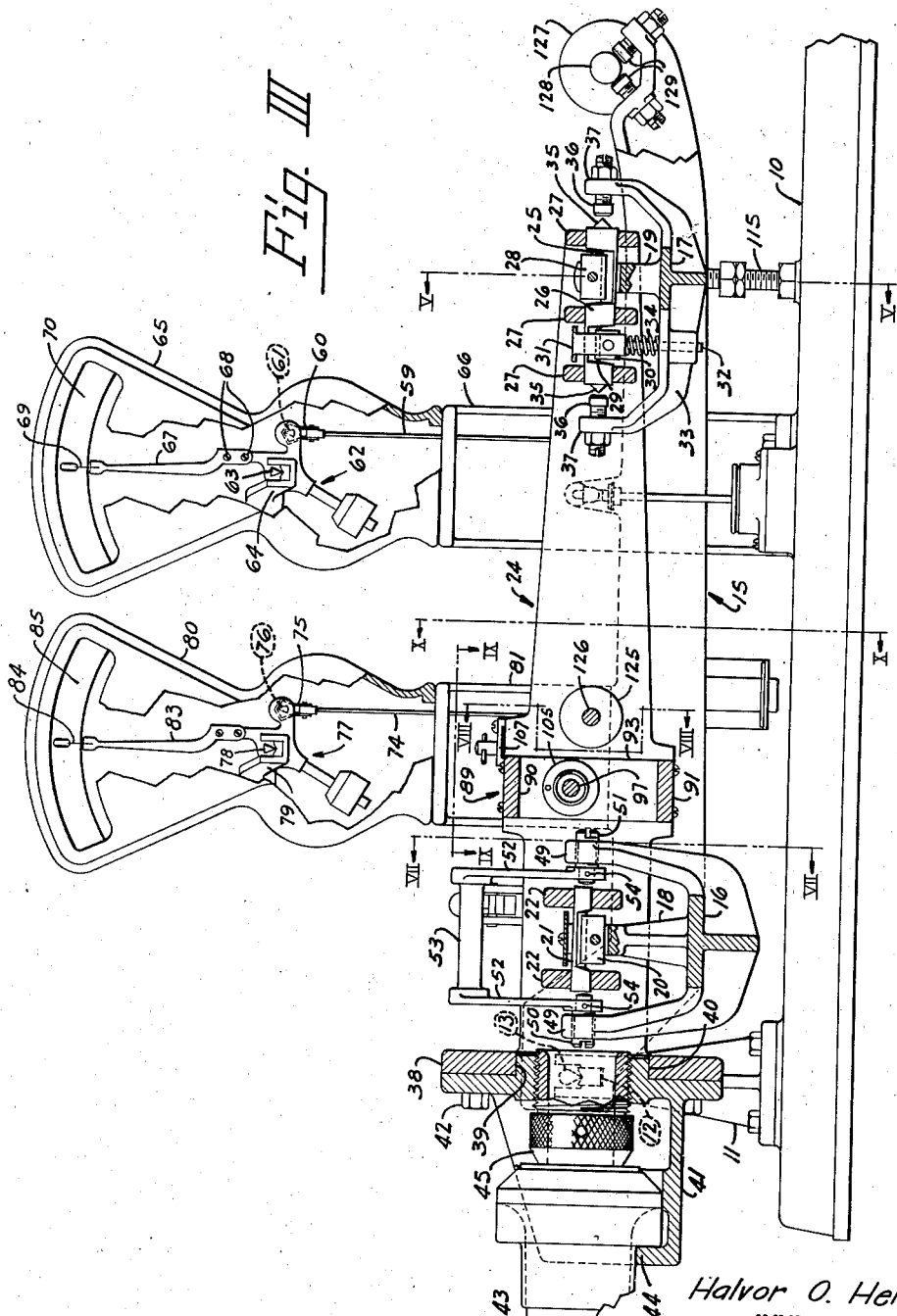

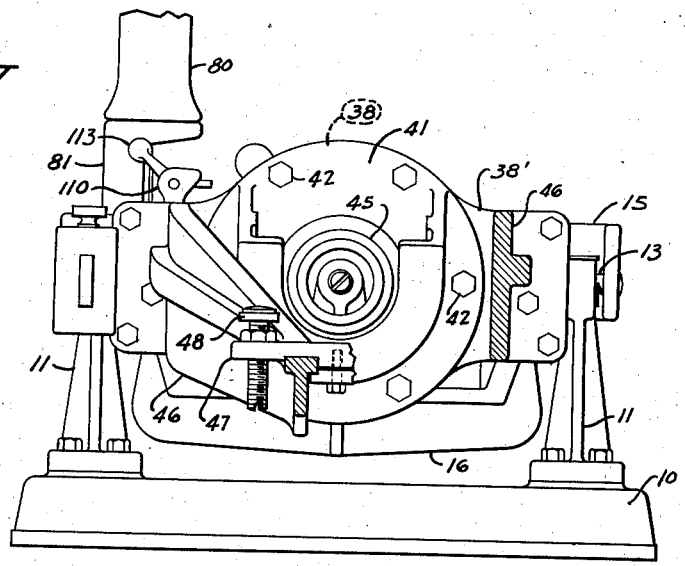
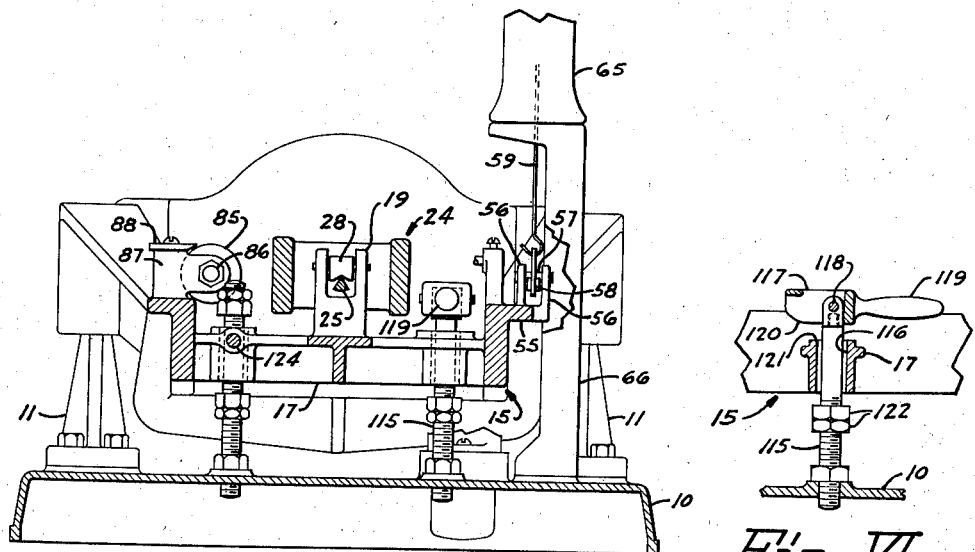

June 11, 1940.  H. O. HEM  2,203,782
TESTING DEVICE
Filed Jan. 11, 1939  4 Sheets-Sheet 4
Fig. VII
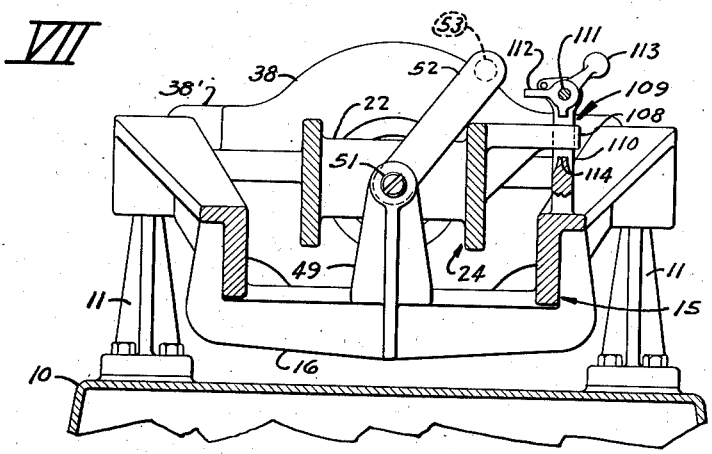
Fig. VIII
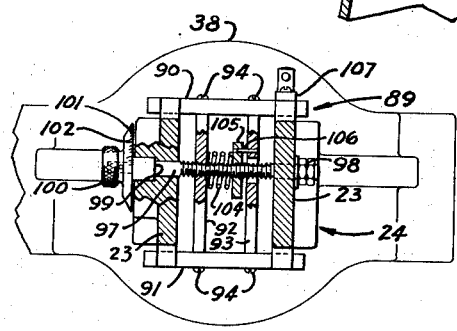
Fig. IX
Fig. X
Halvor O. Hem
INVENTOR
BY Marshall & Marshall
ATTORNEYS Patented June 11, 1940

2,203,782

UNITED STATES PATENT OFFICE 2,203,782

TESTING DEVICE

Halvor O. Hem, Toledo, Ohio, assignor to Toledo Scale Manufacturing Company, Toledo, Ohio, a corporation of New Jersey Application January 11, 1939, Serial No. 250,398

12 Claims. (Cl. 73—53)

This invention relates generally to testing devices, and more particularly to devices for statically balancing and reproducing blades for propellers such as are used on aircraft or other devices employing air screws.

It has heretofore been customary to reproduce propeller blades in conformity with a master. Such master blades, however, must be permanently retained for reference purposes and furthermore a master blade must be supplied to each source of supply of that blade. The wastefulness of this method in both time and money is obvious.

The primary object of this invention is a device for quantitatively determining a plurality of static moments of a propeller blade.

Another object is the provision of an improved device whereby propeller blades may be given the same definite quantitative characteristics without comparison with a master blade.

Another object is the provision of an improved device for determining quantitatively a plurality of static moments and in which the propeller blades are supported substantially in the same manner in which they are supported in the craft in which they are used.

Still another object is the provision of an improved propeller blade balancing device in which the longitudinal static moment and the transverse static moment about its longitudinal axis may be determined in definite units, such as inch-pounds.

These, and other objects and advantages will be apparent from the following description in which reference is had to the accompanying drawings, illustrating a preferred embodiment of the invention and in which similar reference numerals refer to similar parts throughout the several views.

Referring to the drawings:

Fig. I is a front elevational view of the device.

Fig. II is a plan view thereof.

Fig. III is an enlarged, fragmentary front elevational view, parts broken away and others sectioned along the line III—III of Fig. II.

Fig. IV is an enlarged, transverse sectional view substantially along the line IV—IV of Fig. II.

Fig. V is an enlarged, transverse sectional view sectional substantially along the line V—V of Fig. III.

Fig. VI is an enlarged, fragmentary sectional view of one of the locking means, it being sectioned substantially along the line VI—VI of Fig. II.

Fig. VII is an enlarged, fragmentary transverse sectional view substantially along the line VII—VII of Fig. III.

Fig. VIII is an enlarged, sectional view substantially along the line VIII—VIII of Fig. III, and showing in detail a micrometer poise actuating means.

Fig. IX is an enlarged, fragmentary plan view of the micrometer poise as seen substantially from along the line IX—IX of Fig. III; and, Fig. X is a transverse sectional view substantially along the line X—X of Fig. III.

Referring to the drawings in detail:

The device comprises a base 10 upon which are mounted, adjacent one of its ends, a pair of fulcrum stands 11 having V bearings 12 in their upper ends. These V bearings 12 form seats for fulcrum pivots 13 which span bifurcations in longitudinal arms 14 of a beam 15. The arms 14 are connected by transverse members 16 and 17 and the member 16 is provided with an integral upwardly extending fulcrum stand 18. A fulcrum stand 19 is also an integral part of the transverse member 17.

A V bearing 20, which is alignably seated in the upper end of the fulcrum stand 18, supports a pivot 21 fixed in transverse webs 22 connecting longitudinally extending arms 23 of a lever 24 whose opposite end is provided with an upwardly directed knife edge 25 in a pivot 26 which spans the spaces formed by three transversely extending webs 27, and engages the downwardly directed V of a bearing 28 adjustably seated in the fulcrum stand 19. Another knife edge 29 of the pivot 26, collinear with the knife edge 25, but facing in the opposite direction, engages a bearing 30 rockably mounted in a bracket 31 fixed to the upper end of a rod 32 which is slidably seated in a vertical bore in an extension 33 of the transverse member 17 of the beam 15. A helical spring 34, circumjacently mounted on the rod 32 and seated on the extension 33, urges the pivot 26 upwardly and its knife edge 25 into close engagement with the inverted V of the bearing 28. Conical thrust points 35 on each end of the pivot 26 cooperate with adjustable thrust members 36 in upwardly extending arms 37 to prevent endwise movement of the lever 24 relative to the beam 15 on which it is fulcrumed.

The opposite ends of the longitudinally extending arms 23 of the lever 24 are integrally connected to a disk-like flange 38 whose outer surface is machined so that it lies in a plane passing vertically through the knife edges of the pivots 13 in the beam 15. This flange 38 has a concentric circular bore 39 in which is seated a machined boss 40 extending from the machined, rear face of a propeller blade shank receiver 41 which is fastened to the flange 38 by a plurality of bolts 42. The receiver 41 is adapted to receive the shank of the propeller blade 43 when it is held horizontally and lowered vertically, its lower portion is shaped to closely engage the contour of this shank. An inwardly extending flange 44 on the outer end of the receiver 41 is adapted to engage with a shoulder on the shank and cooperate with a clamp member 45 threaded through the boss 40 to securely clamp the blade 43 in horizontal position.

To relieve the strain on the receiver 41 when a propeller is clamped therein by supporting its free end, extensions 46 are bolted to arms 38' extending transversely and forwardly on each side of the flange 38 of the lever 24 and a cross arm 47 is adjustably mounted on these extensions 46. This cross arm is provided with stops 48 adapted to be adjusted so that they may engage the lower surface of the blade 43.

For a purpose which will later become clear, the transverse member 16 of the beam 15, on the longitudinal axis of the lever 24, is provided with two upwardly extending arms 49 having bores which are collinear with the edge of the pivot 21 in the lever 24. Threaded in these bores are thrusts 50 and 51 having inwardly directed turned-down portions which enter bores in parallelly disposed arms 52 of a handle 53 in which they are locked by means of pins 54. Since one of these thrusts, for example 50, is provided with a left hand thread and the other thrust 51 with a right hand thread, rotation of the handle 53 in one direction causes the thrusts 50 and 51 to slightly approach each other, bending the relatively flexible arms 52 of the handle and to engage the opposite ends of the pivot 21, in the lever 24, which is positioned between them. Rotation of the handle 53 in the opposite direction however, causes these thrusts 51 and 52 to recede and free the pivot 21.

Means are provided for indicating the condition of balance of the beam 15 and the lever 24 before a propeller blade has been clamped thereto and after such blade has been attached for determining its static moments. For cooperation when determining the longitudinal static moment of a blade these means comprise a short integral arm 55, extending laterally from the beam 15, having two upwardly extending ears 56 between which a power pivot 57 is seated. This power pivot 57 engages a stirrup 58 suspended from a connecting rod 59 whose upper end, by means of a stirrup 60, engages a load pivot 61 fixed in an arm of a pendulum 62, fulcrumed by means of a pivot 63 on "V" bearings in a bracket 64 secured to a wall of an indicator housing 65 surmounting an extension 66 which is bolted in proper position to the base 10. An upwardly directed indicator 67, secured to the pendulum 62 by means of screws 68, cooperates with an indicium 69 on a chart 70 fixed in the upper portion of a housing 65. For indicating the condition of balance of the lever 24 about its axis formed by the fulcrum pivots 21 and 26 and to aid in the determination of the transverse static moment of the propeller blade when clamped to the system, a transversely extending arm 71, secured to the lever 24, engages a stirrup 73 with its power pivot 72. This stirrup 73 is suspended from the lower end of a connecting rod 74, whose upper end is provided with a stirrup 75 engaging a pivot 76 in an arm of a pendulum 77 fulcrumed by means of a pivot 78 upon a bracket 79 in the interior of a housing 80 which surmounts an extension 81 fixed to a shaft 82 of the beam 15 (Figures IX and X). This pendulum 77 is also provided with an upwardly extending indicator 83 to cooperate with an indicium 84 on a chart 85 stationed in the housing 80.

Since, however, it is an object to quantitatively determine the static moments of the propeller blade being tested there is provided a cylindrical poise 85, threaded upon a micrometer screw 86 locked between two arms 87 extending inwardly from one of the longitudinal arms 14 of the beam 15. Also secured to this arm 14, in such a manner that it partially overlaps the poise 85, is a plate 88 (Fig. X) provided with a series of graduations 88'. These graduations cooperate with a datum line 85' extending around the periphery of the poise 85. The poise 85 is so calibrated with respect to the threads of the screw 86 and the graduations on the plate that one complete turn of the poise represents one inch-pound and advances the datum line from one graduation to another. The body of the poise 85 is provided with a series of graduations $85^2$, each of which represents a fraction of an inch-pound.

To establish a transverse static moment of a propeller blade quantitatively in inch-pounds, or other definite units, a micrometer poise 89 is provided. This micrometer poise 89 (Figures VIII and IX) comprises a top member 90 and a bottom member 91 seated respectively in machined ways on the top and bottom of the longitudinal arms 23 of the lever 24. These members 90 and 91 are connected by vertical plates 92 and 93 and are assembled into a unit by means of screws 94 in such manner that the assembled unit may slide freely in a direction transverse to the pivotal axis of the lever 24. The weight of this frame-like poise is carefully adjusted by removing metal by drilling holes in the member 91. The plate 90 is provided with a series 95 of indicia and a line 96 engraved on a machined pad on the beam 24 serves as a reading index. In this example, it is assumed that each of the graduations in the series 95 represents one inch-pound. To actuate this poise, a micrometer screw 97 extends freely through bores in the longitudinally extending arms 23 and through a bore in the vertical plate 93 of the poise, but it is threaded through a bore in the vertical plate 92. The screw 97 is held against endwise movement by nuts 98 which are threaded on an end projecting beyond one of the arms 23 of the lever 24. A shoulder 99 serves as a locating stop. The micrometer screw 97, so that it may be readily turned, has pinned to its other projecting end a hand knob 100 and a graduated dial 101 which is integral with the knob. A series 102 of graduations marked on this dial cooperates with an index 103, engraved on a polished spot on the lever 24 immediately in back of the dial 101.

To eliminate any possibility of lost motion between the screw 97 and the poise 89 a helical spring 104 is circumjacently mounted upon the screw 97 between the vertically extending plate 92 and a nut 105 which is threaded upon the screw 97 closely adjacent the vertical plate 93 of the poise. This nut 105 is prevented from turning with the screw by the action of a pin 106 studded into the nut and projecting freely into a hole drilled in the plate 93. The bias of this spring 104 thus urges the poise in one direction so that the same sides of the threads on the screw and in the plate 92 are always in engagement regardless in what direction the screw is turned. A clamp 107 is adapted to lock the poise 89 in adjusted position.

During one phase in the determination of the static moments of a propeller blade it is necessary that the lever 24 be locked against movement relative to the beam 15. This is also a necessary operation when a propeller blade is being mounted in or is being removed from the receiver 41. For this purpose, the lever 24 is equipped with a horizontal arm 108 which extends (Fig. VII) into a trig lock 109 arising from the beam 15. This trig lock comprises spaced posts 110 whose upper ends support the ends of a short shaft 111 upon which a latch 112 is rotatably seated. By turning a handle 113, which is integral therewith, the latch 112 may be turned so as to lock the extending arm 108 of the lever 24 against a bar 114 extending between the posts 110 and thus prevent the lever 24 from rocking on its pivots. The beam 15 must also be locked when a propeller is being inserted or removed, while work is performed thereon and when the transverse static moment is being determined. To accomplish this, a post 115 is studded into the base 10 so that it projects through an aperture 116 in the transverse member 17 of the beam 15. To the upper end of this post 115 is pivotally secured a bifurcated cam-like locking member 117, fulcrumed on a pin 118 which passes through the spaced arms of this member 117 and through a bore in the post 115. When the member 117 is turned by means of an integral handle 119, rounded corners 120 of the cam-like portion engage a machined pad 121 on the transverse member 17 and force this transverse member downwardly until the handle 119 is in a vertical position and the lower surface of the transverse member 17 rests against nuts 122 which are adjustably threaded on the post 115 thus locking the beam 15 to the base 10.

In conditioning the device for operation, the proper receiver 41 for the type of propeller blade to be balanced is first attached to the cross member 38 by means of the bolts 42. The cross arm 47 is then positioned so that its stops 48 will be in position to engage the blade at a point somewhat beyond its center of gravity. The static balance of the beam about its turning axis is then established by moving a balance weight 123 along a threaded rod 124 extending horizontally from the transverse member 17 parallel to the longitudinal axis of the beam 15. When this moment or balance is established the indicator 67 is in registration with the zero indicium 69 on the chart 70. During this step the lever 24 is positively positioned on the longitudinal axis of the beam 15 by turning the handle 53 which causes the thrusts 50 and 51, in the manner hereinbefore described, to engage the pivot 21 in the lever 24 and this lever is also locked to the beam by means of the trig lock 109.

Before balancing the lever 24 so that it has a zero moment about its longitudinal axis the beam 15 is locked to the base by moving the handle 119 into its vertical position. The trig lock 109 is then unlocked and the thrusts 50 and 51 disengaged from the ends of the fulcrum pivot 21. If the indicator 83 registers with the zero indicium 84 on the chart 85 no further work need be done but if this indicator is not in registration with the aforementioned indicium then a balance weight 125, mounted upon a screw 126, which extends transversely between the arms 23, is shifted until the indicator 83 assumes a position in registration with the indicium 84. It, of course, is understood that in establishing the static balance of the beam 15 and the lever 24 the poises 85 and 89 must be in their zero positions.

When the balance of the system has been established the beam 15 and the lever 24 are again locked by the means previously described and the propeller blade 43 is held horizontally with its shank directly above the receiver 41 and then lowered carefully therein. The blade is then securely locked in this receiver by turning the clamping member 45 against the butt of the propeller shank and the other end of the blade is then supported, to relieve any strain, on the stops 48 which are adjusted into engagement with the surface of the blade.

In the operation of establishing the longitudinal static moment of a blade, after such blade has been mounted in the receiver, the beam 15 is unlocked so that it may oscillate about its turning axis, care being taken that the lever 24 is positively positioned on the longitudinal axis of the beam by the thrusts 50 and 51 in the manner hereinbefore described and that the lever 24 is locked securely to the beam by the trig lock 109. Weights 127, which are cylindrical in shape, are then threaded upon a bar 128 which is calibrated to a definite weight and this bar 128 is then placed on a "V" bearing formed by two adjustable rests 129 in the end of the beam 15. The number of weights placed on this bar must be such so that they do not quite counterbalance the weight of the blade on the opposite side of the turning axis of the beam, as indicated by the indicator 67. The poise 85 is then turned on the micrometer screw 86 until this indicator 67 registers with the indicium 69 on the chart 70. The sum of the weights 127 and the weight of the bar 128 plus the amount indicated by the poise 85 is the longitudinal static moment of the blade which, if within the predetermined tolerance, is then recorded together with the serial number of the blade.

The transverse static moment of this blade is now determined by locking the beam 15 to the base by turning the handle 119 and unlocking the lever 24 from the beam 15 by opening the trig lock by means of the handle 113. The handle 53 is then turned and the thrusts 50 and 51 disengaged from the ends of the pivot 21 so that the lever 24 may oscillate freely. The poise 89 is now moved into a position by means of the hand knob 100 after loosening the clamp 107 until the indicator 83 within the housing 80, which is mounted upon the beam 15, registers with the indicium 84 on the chart 85. The amount of this static moment, if within the predetermined tolerance, is then entered against the serial number of the blade on the record.

It will now be apparent that when it becomes necessary to replace this blade, another blade may be conditioned in this manner so that its moments correspond to those recorded. It is, of course, obvious that when either the longitudinal or transverse static moment is not within the predetermined tolerance that material may be removed from the blade, or added, to bring it within the tolerance without removing the blade from the receiver after securely locking the beam and lever.

The embodiment of the invention herin shown and described is to be regarded as illustrative only, and it is to be understood that the invention is susceptible to variation, modification and change within the spirit and scope of the subjoined claims.

Having described the invention, I claim:

1. In a device of the class described, in combination, a base, a beam, fulcrum pivots extending laterally in said beam, bearings mounted on said base for the reception of said pivots and forming a rocking axis for said beam, a plurality of bearings mounted on the longitudinal axis of said beam and in a horizontal plane passing through said fulcrum pivots, a lever pivoted on said bearings and means comprising relatively movable members having a common actuator for definitely positioning said lever on the longitudinal axis of said beam with respect to its rocking axis.

2. In a device of the class described, in combination, a base, a beam, pivots extending laterally in said beam, bearings mounted on said base for the reception of said pivots forming a rocking axis for said beam, a plurality of bearings mounted on said beam and positioned in its longitudinal axis, a lever pivoted on said bearings, means comprising relatively movable members for definitely positioning said lever on the longitudinal axis of said beam with respect to its rocking axis and means for independently preventing relative movement between said base and said beam and between said beam and said lever.

3. In a device of the class described, in combination, a base, a beam, aligned pivots in said beam for oscillatably mounting said beam upon said base, a plurality of bearings on said beam, said bearings being mounted in alignment perpendicular to the pivotal axis of said beam, a lever pivotally mounted on said bearings, means for definitely positioning said lever with respect to said beam, a pendulated indicator operatively connected to said beam, another pendulated indicator operatively connected to said lever for indicating their conditions of balance, one of said pendulated indicators being pivotally mounted on said beam and the other of said pendulated indicators being pivotally mounted on said base.

4. In a device of the class described, in combination, a base, a beam, fulcrum pivots extending laterally in said beam, bearings mounted on said base for the reception of said pivots and forming a rocking axis for said beam, a plurality of bearings mounted on the longitudinal axis of said beam and in a horizontal plane passing through said fulcrum pivots, a lever pivoted on said bearings, means comprising relatively movable members for definitely positioning said lever on the longitudinal axis of said beam with respect to its rocking axis and means for independently preventing relative movement between said base and said beam and between said beam and said lever.

5. In a device of the class described, in combination, a base, a beam, fulcrum pivots extending laterally in said beam, bearings mounted on said base for the reception of said pivots and forming a rocking axis for said beam, a plurality of bearings mounted on the longitudinal axis of said beam and in a horizontal plane passing through said fulcrum pivots, a lever pivoted on said bearings, means comprising relatively movable members for definitely positioning said lever on the longitudinal axis of said beam with respect to its rocking axis, means for independently preventing relative movement between said base and said beam and between said beam and said lever, said movement preventing means comprising an adjustable stop on said base, movable means on said beam for moving and holding a portion of said beam in engagement with said adjustable stop and a stop and a movable member on said beam for moving and holding a portion of said lever in engagement with said stop.

6. In a device of the class described, in combination, a base, a beam, fulcrum pivots extending laterally in said beam, bearings mounted on said base for the reception of said pivots and forming a rocking axis for said beam, a plurality of bearings mounted on the longitudinal axis of said beam, a lever pivoted on said bearings, means comprising relatively movable members for definitely positioning said lever on the longitudinal axis of said beam with respect to its rocking axis, said means comprising portions of said beam in alignment with and positioned on opposite sides of a portion of said lever, stops in said beam portions having equal but opposite motion and common means for simultaneously imparting such opposite and equal motion to said stops for engaging said portion of said lever and moving said lever into predetermined position.

7. In a device of the class described, in combination, a base, a beam, fulcrum pivots extending laterally in said beam, bearings mounted on said base for the reception of said pivots and forming a rocking axis for said beam, a plurality of bearings mounted on the longitudinal axis of said beam, a lever pivoted on said bearings, means comprising relatively movable members for definitely positioning said lever on the longitudinal axis of said beam with respect to its rocking axis, said means comprising portions of said beam in alignment with and positioned on opposite sides of a portion of said lever, threaded members in said lever portion having equal but opposite motion and common means for simultaneously imparting such opposite and equal motion to said members for engaging said portion of said lever and moving said lever into predetermined position, one of said members being provided with a right hand thread and the other of said members being provided with a left hand thread, and said common, motion imparting means comprising a plurality of slightly flexible arms and a handle, connecting said arms, for turning said threaded members.

8. In a device of the class described, in combination, a base, a beam, means for oscillatably mounting said beam upon said base, a lever, means upon said beam for oscillatably mounting said lever upon said beam with its oscillating axis perpendicular to the oscillating axis of said beam, a propeller blade shank receiver secured to said lever, said receiver being adapted to receive such propeller when the longitudinal axis of said propeller blade is horizontal and the propeller is lowered vertically, means for locking said propeller in said receiver, means for preventing relative movement between said beam and said lever whereby said beam, said lever and said propeller blade rock as a unit about the rocking axis of said beam and means for supporting the free end of said propeller blade.

9. In a device of the class described, in combination, a base, a beam, means for oscillatably mounting said beam upon said base, a lever, means upon said beam for oscillatably mounting said lever upon said beam with its oscillating axis perpendicular to the oscillating axis of said beam, a propeller blade shank receiver secured to said lever, said receiver being adapted to receive such propeller blade shank when the longitudinal axis of said propeller blade is horizontal and the propeller blade is lowered vertically, means for locking said propeller blade shank in said receiver and means for preventing relative movement between said beam and said lever whereby said beam, said lever and said propeller blade rock as a unit about the rocking axis of said beam, means for counterbalancing the weight of said propeller blade and means including a pendulated indicator for indicating the condition of balance of said assembly.

10. In a device of the class described, in combination, a base, a beam, means for oscillatably mounting said beam upon said base, a lever, means upon said beam for oscillatably mounting said lever upon said beam with its oscillating axis perpendicular to the oscillating axis of said beam, a propeller blade shank receiver secured to said lever, said receiver being adapted to receive such propeller blade when the longitudinal axis of said propeller blade is horizontal and the propeller blade is lowered vertically, means for locking said propeller blade in said receiver, means for supporting the free end of said propeller blade and means for preventing relative movement between said beam and said lever whereby said beam, said lever and propeller blade rock as a unit about the rocking axis of said beam, means for preventing rocking of said beam with respect to said base whereby said lever may rock independently of said beam and a pendulated indicator mounted upon said beam and operatively connected to said lever for indicating the condition of balance of said lever and of said lever and propeller blade.

11. In a device of the class described, in combination, a base, fulcrum bearings mounted upon said base, a beam, fulcrum pivots in said beam for rockably mounting said beam upon said bearings, said beam comprising a pair of longitudinally extending arms and a pair of transversely extending arms, bearings mounted upon said transversely extending arms in alignment with the longitudinal axis of said beam, a lever pivoted upon said bearings entirely on one side of said fulcrum pivots of said beam and lying between the longitudinal arms thereof, said plurality of bearings for said lever comprising at least two bearings facing in one direction and one bearing facing in the opposite direction, said oppositely facing bearing being spring-urged in the direction in which it is facing and releasable means on said beam to force said lever into a predetermined position with respect to the fulcrum pivots of said beam.

12. In a device of the class described, in combination, a base, fulcrum bearings mounted upon said base, a beam, fulcrum pivots in said beam for rockably mounting said beam upon said bearings, said beam comprising a pair of longitudinally extending arms and a pair of transversely extending arms, bearings mounted upon said transversely extending arms in alignment with the longitudinal axis of said beam, a lever pivoted upon said bearings entirely one side of said fulcrum pivots of said beam and lying between the longitudinal arms thereof, said plurality of bearings for said lever comprising at least two bearings facing in one direction and one bearing facing in the opposite direction, said oppositely facing bearing being spring-urged in the direction in which it is facing, releasable means on said beam to force said lever into a predetermined position with respect to the fulcrum pivots of said beam, means operatively connected to said beam and other means operatively connected to said lever for indicating independently their conditions of balance.

HALVOR O. HEM.